(No Model.)
D. DENNES.
COMBINED CHLORINATING AND FILTERING VESSEL.
No. 465,654. Patented Dec. 22, 1891.
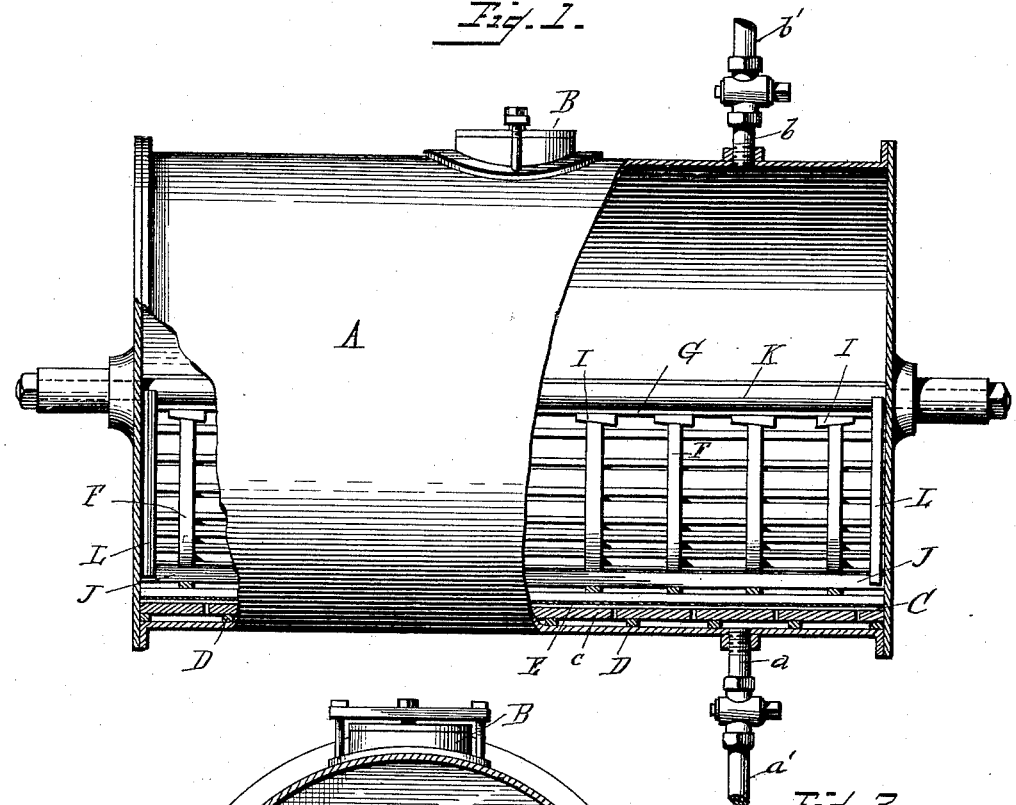
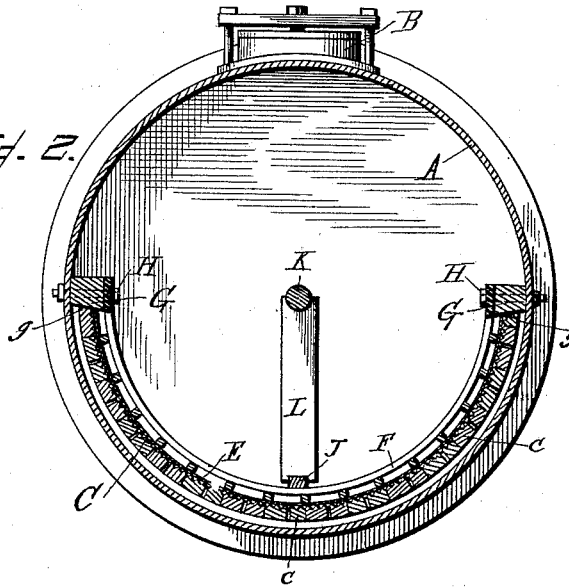
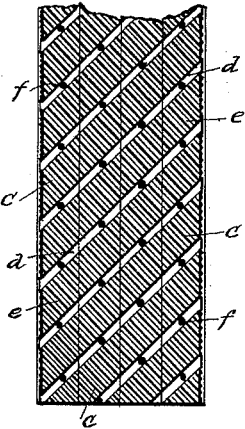
Witnesses
Donald Dennes Inventor
By his Attorneys Finckel & Finckel

UNITED STATES PATENT OFFICE.

DONALD DENNES, OF DEADWOOD, SOUTH DAKOTA.

COMBINED CHLORINATING AND FILTERING VESSEL.

SPECIFICATION forming part of Letters Patent No. 465,654, dated December 22, 1891.

Application filed February 24, 1891. Serial No. 382,523. (No model.)

*To all whom it may concern:*

Be it known that I, DONALD DENNES, a subject of Victoria, Queen of Great Britain, residing at Deadwood, in the county of Lawrence and State of South Dakota, have invented certain new and useful Improvements in Combined Chlorinating and Filtering Vessels, of which the following is a specification, reference being had therein to the accompanying drawings.

My improvements relate to chlorinating-vessels provided with a filter; and they consist in the construction and combination of parts hereinafter described and claimed.

Figure 1 is a longitudinal view, partly in elevation and partly in section. Fig. 2 is a transverse vertical sectional view, and Fig. 3 is a plan view of the upper surface of the filter-bed.

In the drawings referred to, the chlorinating-vessel A is represented as being wholly cylindrical and provided with trunnions at its ends, whereon it is supported and rotated.

A man-hole B, with an air-tight cover, is provided in the side of the vessel for the introduction of the charge. On the interior of the vessel opposite the man-hole I secure the curved filter, which is supported a short distance from the interior surface of the vessel by an interposed series of curved slats D, in order that the filtered liquid may pass freely to the discharge-passage $a$. An inlet $b$ opposite the filter is provided to admit air or steam under pressure when it is desired to force the liquid quickly through the filter.

$a'$ represents the end of a pipe detachably connected with the outlet $a$ for conveying the liquid to any desired point, and $b'$ a portion of a pipe detachably connected with the inlet $b$ and communicating with a supply of compressed fluid. Before rotating the barrel these pipes will be disconnected and the inlet $b$ and outlet $a$ be closed.

The filter is composed of the filter-bed C, formed of a number of corrugated and perforated staves $c$ and a piece of asbestus cloth E extended thereover. The corrugations $d$ and $e$ are made to extend diagonally across the filter-bed, as shown in Fig. 3, so that should any particles of sand or other matter get through the cloth E the rotation of the barrel will keep them in motion until they finally pass through one of the perforations $f$, and thus free the corrugations of any such obstructions.

A curved grating F is placed upon the filter to prevent displacement of the staves, retain the cloth in position, and to protect the same from abrasion by the solid substances when they are agitated in the vessel.

The filter and grating are held in place by two bars G G, secured longitudinally on opposite sides of the interior of the vessel A, each bar having an inclined or wedge-like surface which bears, respectively, on the end staves of the filter-bed and upon the edges of the grating. These bars are secured to the sides of the vessel by screw-bolts H, so that their inclined surfaces may be brought to bear tightly upon the edges of the filter and grating.

Wedge-blocks $I_a$ may be used between the bars G and the filter-bed and grating when a tight adjustment of the parts cannot be had without them.

The grating F is held firmly in place along its longitudinal middle line by means of a beam J and struts or braces L, which are wedged in between the ends of the beam and the axial shaft or bar K of the cylinder, as shown.

Having thus described my invention, what I claim is—

1. In combination, the vessel A, having the man-hole B and outlet $a$, a filter therein placed between the man-hole and outlet, means for securing the filter in place, consisting of the adjustble bars G G, each having an inclined surface $g$, and means for pressing the bars against the edges of the filter, substantially as shown and described.

2. In combination, the vessel A, having the man-hole B and outlet $a$, a filter located between the outlet and man-hole, composed of the filter-bed C and cloth E, extended thereover, a grating fitting upon the filter, and means for pressing the grating firmly against the filter, consisting of the shaft or bar K and the struts or braces L between the shaft and grating, substantially as shown and described.

3. In combination, the rotatable vessel A, having a man-hole B and outlet $a$, a filter therein and located between the man-hole and outlet, composed of the perforated filter-bed C and cloth E, the filter-bed having diagonal corrugations, and means for securing the filter in place, substantially as shown and described.

In testimony whereof I affix my signature in presence of two witnesses.

DONALD DENNES.

Witnesses:
L. H. MOLT,
JOHN WALTON.